E. J. VARGYAS.
PORTABLE FARE AND TICKET RECEPTACLE.
APPLICATION FILED MAR. 28, 1908.
No. 906,835.
Patented Dec. 15, 1908.
3 SHEETS—SHEET 1.
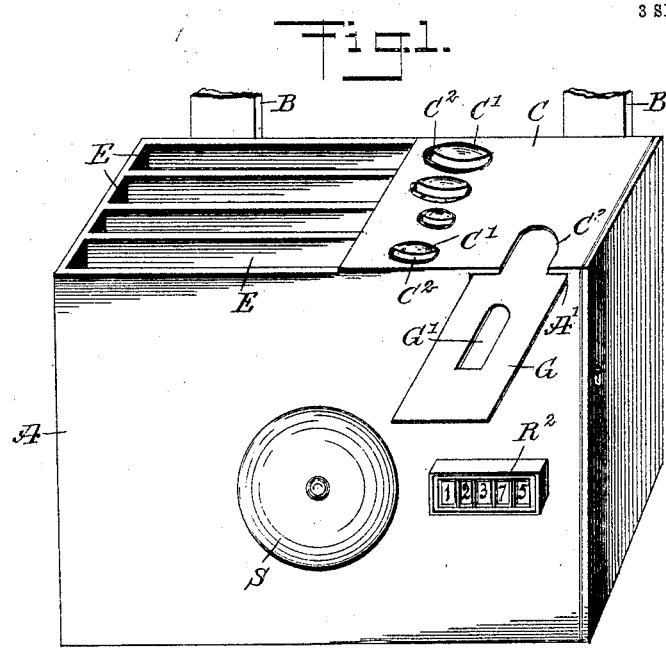
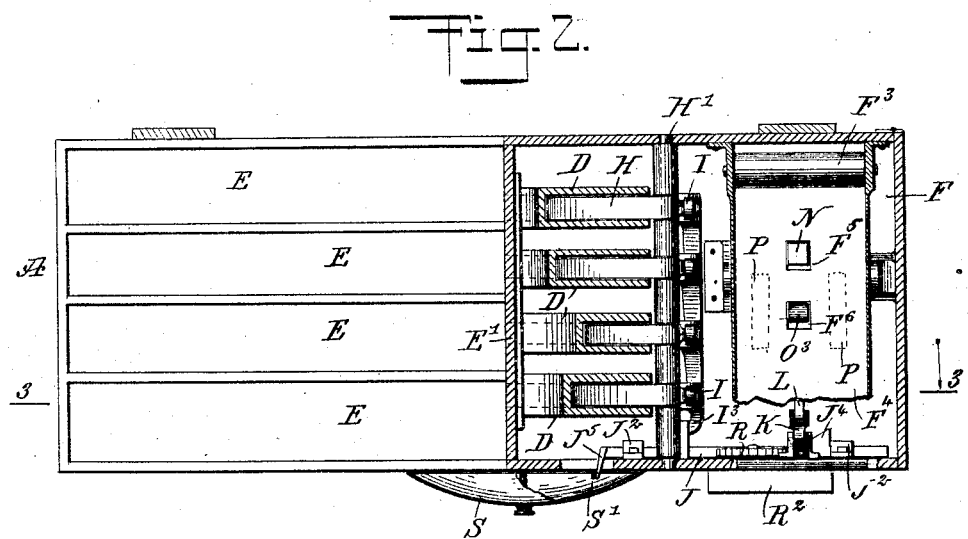
WITNESSES
INVENTOR
Eugene J. Vargyas
BY
ATTORNEYS

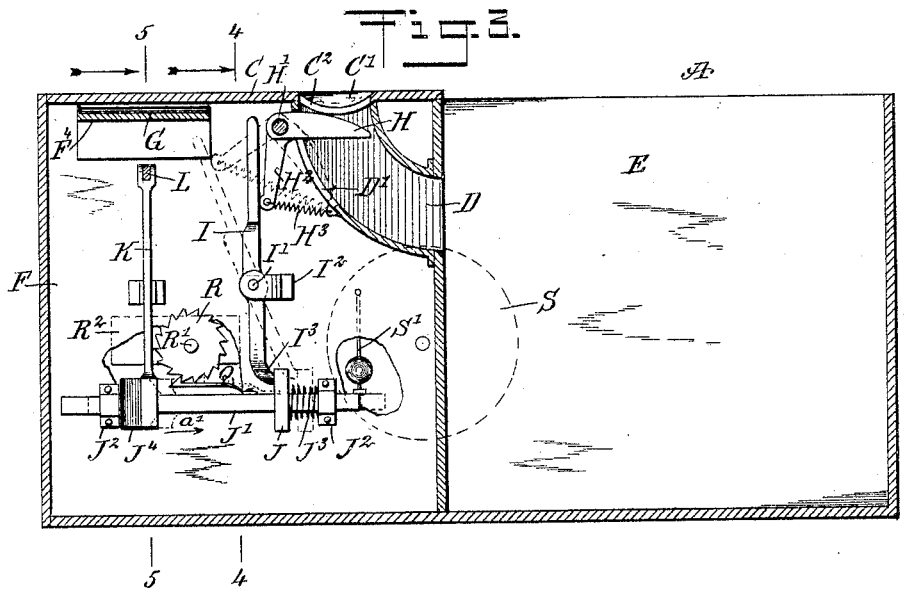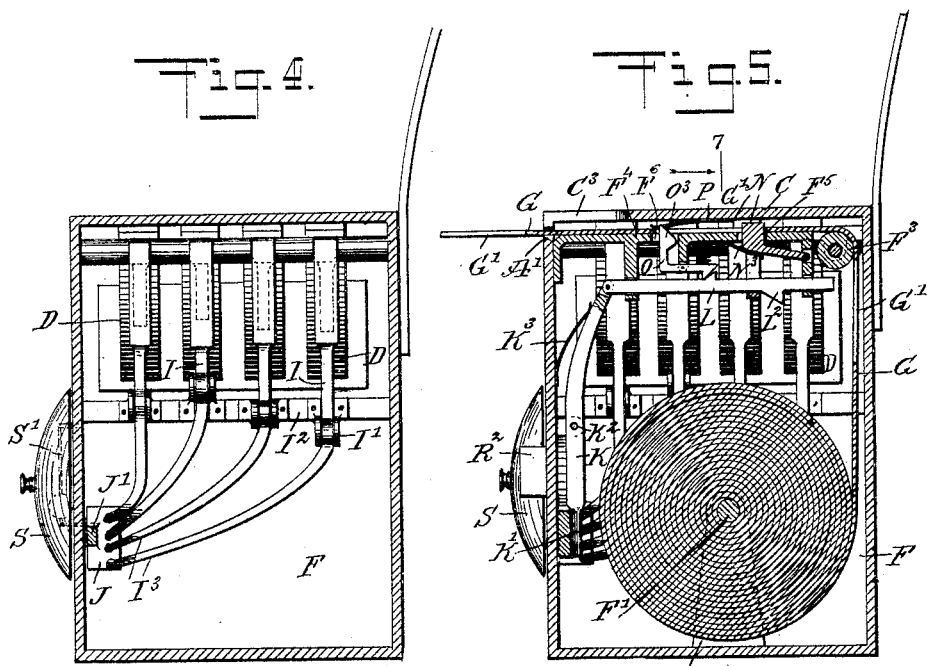

E. J. VARGYAS.
PORTABLE FARE AND TICKET RECEPTACLE.
APPLICATION FILED MAR. 28, 1908.

906,835.

Patented Dec. 15, 1908.

3 SHEETS—SHEET 3.

WITNESSES

INVENTOR
Eugene J. Vargyas
BY
ATTORNEYS

UNITED STATES PATENT OFFICE.

EUGENE J. VARGYAS, OF NEW YORK, N. Y., ASSIGNOR OF ONE-FOURTH TO BONAVENTURA SEMSEY, OF NEW YORK, N. Y.

PORTABLE FARE AND TICKET RECEPTACLE.

No. 906,835.     Specification of Letters Patent.     Patented Dec. 15, 1908.

Application filed March 28, 1908. Serial No. 423,846.

*To all whom it may concern:*

Be it known that I, EUGENE J. VARGYAS, a subject of the King of Hungary, and a resident of the city of New York, borough of Manhattan, in the county and State of New York, have invented a new and Improved Portable Fare and Ticket Receptacle, of which the following is a full, clear, and exact description.

The object of the invention is to provide a new and improved portable fare and ticket receptacle or box, mainly designed for the use of conductors of street cars and other vehicles, and arranged to provide compartments for the reception of the fare received to allow of conveniently making change, to register the number of fares received, and to provide for the issuance of trip or transfer tickets.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 6:
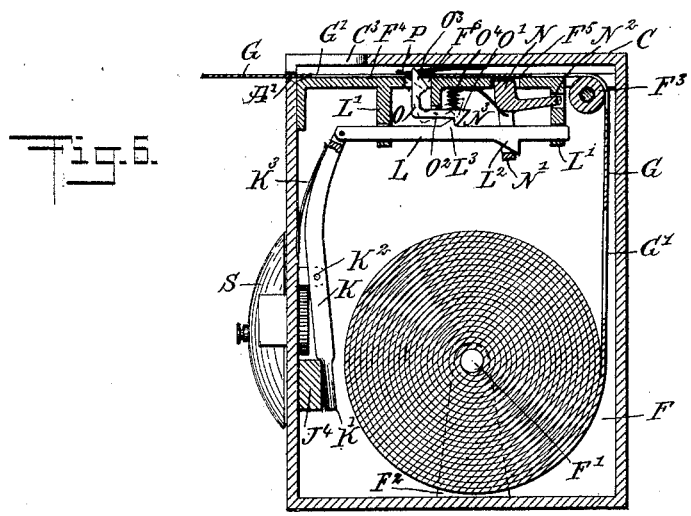
Figure 7:
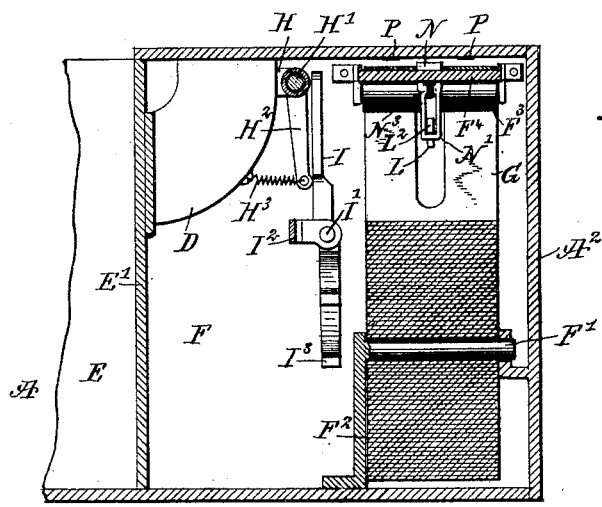

Figure 1 is a perspective view of the improvement; Fig. 2 is a sectional plan view of the same; Fig. 3 is a longitudinal section of the same on the line 3—3 of Fig. 2; Fig. 4 is a transverse section of the same on the line 4—4 of Fig. 3; Fig. 5 is a similar view of the same on the line 5—5 of Fig. 3; Fig. 6 is a like view of the same and showing the ticket controlling mechanism in a different position; and Fig. 7 is a longitudinal section of the improvement on the line 7—7 of Fig. 5.

A suitably constructed casing A is preferably attached to a strap B or similar means for connecting the apparatus to a belt or other means worn by the conductor making use of the device. A portion of the top of the casing A is provided with a cover C, while the remaining portion is open, as plainly indicated in Fig. 1, and the said cover C is provided with dished recesses C', the bottoms of which are provided with slots C² for the introduction of coins of different denominations, such as nickels, dimes, quarters and half dollar pieces. The slots C² lead into the upper ends of downwardly-extending coin chutes D, for delivering coins into pockets E formed in the uncovered portion of the casing A, so that the coins are within convenient reach of the conductor for making change.

The coin pockets E are separated from a compartment F by a transverse partition E' arranged in the casing A, the said compartment F being closed by the cover C. Within this compartment F is held a strip of trip and transfer tickets G, preferably arranged in the form of a roll mounted on a pin F' held in suitable bearings F² to allow of convenient unrolling of the strip of tickets G, the latter passing upward and over a guide roller F³, and then transversely over a table F⁴ held within the compartment F, a short distance below the cover C. The strip of tickets G passes out of the compartment F through a slot A' formed in the front of the casing A, and a recess C³ is formed in the cover C at the front end thereof directly over the strip of tickets G, to permit the conductor to take hold with one finger of the strip of tickets G and push the same outward over the table F⁴, to allow the conductor to tear off the projected ticket at the front of the casing A, the edge of the cover C serving as a knife to conveniently separate the projected ticket from the next following one.

The strip of tickets G is normally locked against movement on the table F⁴, and for this purpose a locking and releasing device is provided, controlled by the coin introduced at the time into any one of the corresponding coin chutes D. For this purpose arms H of bell crank levers extend through slots D' into the coin chutes D near the upper ends thereof, as plainly indicated in Fig. 3, the several bell crank levers being mounted to turn on a transversely-extending rod H' held in the sides of the casing A. The downwardly-extending arms H² of the several bell crank levers are pressed on by springs H³, to normally hold the arms H approximately in a horizontal position directly below the slots C² through which the coins are introduced into the chutes D. The lower ends of the arms H² of the bell crank levers engage the upper ends of levers I, fulcrumed at I' on a transverse bar I² attached to the sides of the casing A, and the lower ends I³ of the several levers I are in contact with a plate J held on a slide J' mounted to slide longitudinally in suitable bearings J² arranged in the compartment F (see Fig. 3). A spring $J^3$ is coiled on the slide $J'$ and rests with one end on one of the bearings $J^2$ and presses with its other end on the plate J, to normally hold the slide $J'$ in the position indicated in Fig. 3. A wedge $J^4$ is secured on the slide $J'$, and when the latter is in a normal position this wedge $J^4$ abuts against the other bearing $J^2$, thus limiting the sliding motion of the slide $J'$ in one direction. The wedge $J^4$ engages the lower end $K'$ of a lever K fulcrumed at $K^2$ within the compartment F, and the upper end of this lever K is pressed on by a spring $K^3$ to hold the lower end $K'$ of the lever in engagement with the wedge $J^4$. The upper end of the lever K is pivotally connected with one end of a slide L mounted to slide in suitable bearings $L'$ depending from the under side of the table $F^4$, and on the slide L is formed a wedge or incline $L^2$ engaging a stirrup $N'$ of a locking arm N fulcrumed at $N^2$ on one of the bearings $L'$. A spring $N^3$ presses the locking arm N to normally hold the same in uppermost position, that is, to project the free end of the arm N through an opening $F^5$ in the table $F^4$ and through an opening $G'$ formed in each of the tickets of the strip of tickets G (see Fig. 5). On the slide L is also formed a shoulder $L^3$ adapted to be engaged by the hook end $O'$ of a releasing lever O, fulcrumed at $O^2$ on the under side of the table $F^4$, and the said releasing lever O is provided with an upwardly-extending wedge-shaped head $O^3$ passing through an aperture $F^6$ formed in the table $F^4$, to be engaged by the strip of tickets G, as the latter is drawn along by the operator drawing the strip of tickets G over the table $F^4$, as previously explained. A spring $O^4$ presses the lever O so as to keep the hook end $O'$ in engagement with the top of the slide L. Springs P attached to the under side of the cover C press on the top of the strip of tickets G, to hold the strip of tickets against accidental movement over the table $F^4$. Now when a coin is passed by the conductor into any one of the slots $C^4$ and this coin is pressed downward by the conductor then a swinging motion is given to the arm of the corresponding bell crank lever, whereby the corresponding lever I is caused to swing and imparts a sliding motion in the direction of the arrow $a'$ to the slide $J'$ against the tension of its spring $J^3$. The slide $J'$ by the wedge $J^4$ imparts a swinging motion to the lever K, which thus draws the slide L forward, and in doing so the wedge $L^2$ pulls on the stirrup $N'$, to swing the arm N in a downward direction, thus disengaging the arm N from the aperture $G'$ of the strip of tickets G. Thus the strip of tickets G is unlocked and can now be drawn forward the distance of the length of a ticket by the operator, as previously explained, so that the operator can tear off the projected ticket and hand the same to the passenger who paid the fare.

During the forward sliding movement of the slide L the hook end $O'$ of the releasing lever O engages the shoulder $L^3$ (see Fig. 6), to hold the slide L against return movement for the time being; the head $O^3$ of the releasing lever extending into a slot G of the foremost ticket. After the coin has passed the arm H and rolled down the chute D into the corresponding pocket E then the bell crank lever returns to its previous normal position and with it the lever I and slide $J'$, and when the conductor has drawn the strip of tickets G forward the distance of the length of a ticket then the releasing lever O is swung downward on the end wall of the slot $G'$ of the foremost ticket, pressing the head $O^3$ of the releasing lever O, so that the hook end $O'$ thereof moves out of contact with the shoulder $L^3$, and consequently the slide L and the lever K return to the normal position by the action of the spring $K^3$. The slide L in moving rearward releases the stirrup $N'$, and the arm N now swings up into the next following aperture $G'$ in the strip of tickets G, to lock the latter against forward movement, thus holding the strip of tickets while the projected ticket is torn off by the conductor.

From the foregoing it will be seen that whenever a coin is introduced into one of the coin chutes, then the strip of tickets G is unlocked to permit the conductor to pull the strip of tickets forward with a view to detach the projected one and hand the same to the passenger who paid the fare. In case the ticket is to be used as a transfer ticket then the conductor correspondingly punches the said ticket, it being understood that the ticket is of special construction, and it will form the subject matter of a separate application for Letters Patent of the United States. If the coin introduced is of a larger denomination than what the amount of the fare calls for, then the conductor makes change in the usual manner.

In order to register the number of fares received the following arrangement is made: On the slide $J'$ is secured a spring pawl Q (see Fig. 3), engaging a ratchet wheel R fastened on the shaft $R'$ of a counting device $R^2$, which registers successively the number of fares received, it being understood that on moving the slide $J'$ in the direction of the arrow $a'$, the ratchet wheel R is correspondingly turned by the pawl Q. In order to indicate that the conductor has placed the fare into the apparatus, use is made of an alarm S in the form of a bell, the striker S' of which is actuated by an arm J⁵ (see Fig. 2), arranged on one end of the slide J' so that when the latter is pushed in the direction of the arrow a', the striker S' is actuated and the bell is sounded.

Having thus described my invention, I claim as new and desire to secure by Letters Patent:

1. A portable fare and ticket receptacle, comprising a casing, means for supporting and guiding a strip of tickets, a spring-pressed slide, means for actuating the said slide, a locking and releasing device for the said ticket strip, and a sliding member actuated from the said slide and connected with the said locking and releasing device.

2. A portable fare and ticket receptacle provided with a table for the passage of a strip of tickets, a slide, means for operating the slide, a locking lever actuated by the said slide and adapted to engage an aperture in each ticket of the said strip of tickets, and a releasing lever controlled by the strip of tickets and adapted to engage the said slide to hold it temporarily stationary.

3. In a device of the character described, a casing having an apertured support over which a strip of tickets is adapted to be passed, a locking arm adapted to normally project into the opening of the support and to engage an aperture in each ticket of the strip of tickets, a sliding member engaging the locking arm to disengage it from the tickets, and means for operating the sliding member.

4. In a device of the character described, a casing having a support over which a strip of tickets is adapted to be passed, said support being provided with openings, a locking arm normally projecting into an opening of the support and into an opening in each ticket of the strip of tickets, means for operating said arm to disengage it from the tickets, and a releasing lever normally projecting into an opening of the support to be engaged by the strip of tickets, said lever engaging a member of the locking arm operating means to hold it temporarily stationary.

5. In a device of the character described, a casing having an apertured support over which a strip of tickets is adapted to be passed, a pivoted and spring pressed locking arm projecting into an aperture of the support and an opening of a ticket of the strip of tickets, a sliding member for operating the locking arm, means for operating the sliding member, and a pivoted and spring pressed releasing lever projecting into an aperture of the support to be engaged by the strip of tickets, the said lever and member having interlocking engagement to temporarily hold the said member stationary.

6. In a device of the character described, a casing having an apertured support over which a strip of tickets is adapted to be passed, a locking arm for the strip of tickets, a pivoted and spring pressed releasing arm having a hooked end, a spring pressed slide, means for operating the slide, a sliding member having operative connection with the locking arm and provided with a shoulder engaged by the hooked shaped end of the releasing lever, and a connection between the slide and sliding member for operating the latter from the former.

7. In a device of the character described, a casing having an apertured support over which a strip of tickets is adapted to be passed, a spring pressed locking arm normally projecting into an opening of the support and provided with a depending stirrup, a sliding member working in the stirrup of the locking arm and provided with a beveled surface for engaging the stirrup to depress the locking arm, and means for operating the said sliding member.

8. In a device of the character described, a casing having an apertured support over which a strip of tickets is adapted to be passed, a locking arm normally projecting into an opening in the support, a sliding member for operating the locking arm, said member being provided with a shoulder, a spring pressed releasing lever projecting in an opening of the support, said lever being provided with a hook at its lower end for engaging the shoulder of the sliding member, and means for operating the sliding member.

9. In a device of the character described, a casing having an apertured support over which a strip of tickets is adapted to be passed, a spring pressed locking arm projecting into an opening of the support and provided with a depending stirrup, a sliding member working in the stirrup of the locking arm and provided with beveled lug on its under face and a shoulder on its upper face, a spring pressed releasing lever projecting through an opening of the support and having a hook-shaped lower end adapted to engage the shoulder of the sliding member, and means for operating the sliding member.

In testimony whereof I have signed my name to this specification in the presence of two subscribing witnesses.

EUGENE J. VARGYAS.

Witnesses:
  THEO. G. HOSTER,
  EVERARD B. MARSHALL.